(12) United States Patent
Van Der Mee et al.

(10) Patent No.: US 8,087,952 B2
(45) Date of Patent: Jan. 3, 2012

(54) ELECTRICAL CONNECTION DEVICE FOR MAKING SEAT TO SEAT CONNECTIONS

(75) Inventors: Marnix Van Der Mee, Montlouis sur Loire (FR); Emmanuel Demaret, Tours (FR)

(73) Assignee: Radiall, Rosny Sous Bois (FR)

( * ) Notice: Subject to any disclaimer, the term of this patent is extended or adjusted under 35 U.S.C. 154(b) by 0 days.

(21) Appl. No.: 12/466,774

(22) Filed: May 15, 2009

(65) Prior Publication Data

US 2009/0298326 A1    Dec. 3, 2009

(30) Foreign Application Priority Data

May 20, 2008    (FR) ...................................... 08 53254

(51) Int. Cl.
*H01R 13/72*    (2006.01)
(52) U.S. Cl. ........................................................ 439/501
(58) Field of Classification Search .................. 439/162, 439/501; 244/118.6
See application file for complete search history.

(56) References Cited

U.S. PATENT DOCUMENTS

| | | | | |
|---|---|---|---|---|
| 6,644,593 | B2 * | 11/2003 | Lambiaso | 244/118.5 |
| 7,172,155 | B2 * | 2/2007 | Feist et al. | 244/118.6 |
| 7,191,981 | B2 * | 3/2007 | Laib et al. | 244/118.6 |
| 2004/0017648 | A1 | 1/2004 | Tsubaki | |
| 2005/0095903 | A1 | 5/2005 | Stenzel et al. | |
| 2005/0247820 | A1 | 11/2005 | Feist et al. | |
| 2006/0097109 | A1 | 5/2006 | Laib et al. | |

FOREIGN PATENT DOCUMENTS

| | | |
|---|---|---|
| EP | 1 737 095 A1 | 12/2006 |
| WO | WO 2005/094290 A2 | 10/2005 |

OTHER PUBLICATIONS

Sep. 24, 2009 Search Report issued in European Patent Application No. 09 16 0332.

* cited by examiner

*Primary Examiner* — Phuong Dinh
(74) *Attorney, Agent, or Firm* — Oliff & Berridge, PLC

(57) ABSTRACT

The invention relates to an electrical connection device for making a connection between a first seat and a second seat disposed in front of or behind the first seat, in particular in aircraft, wherein the device comprises:

- a casing secured to the first seat and receiving an inlet cable bundle and an outlet cable bundle;
- a cable inlet connector connected to the inlet cable bundle and secured to the casing; and
- a retractable strip received at least in part inside the casing, the outlet cable bundle, extending in said strip, which strip is capable of sliding outwards from the casing in such a manner as to connect said casing to the cable inlet connector of the second seat.

11 Claims, 7 Drawing Sheets

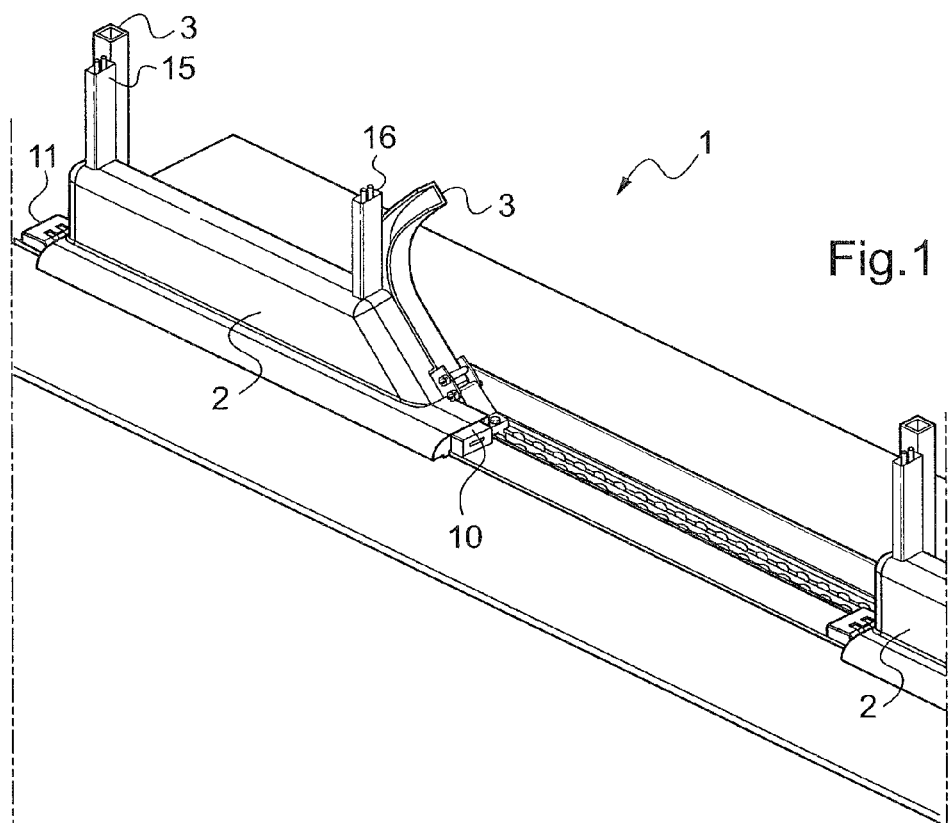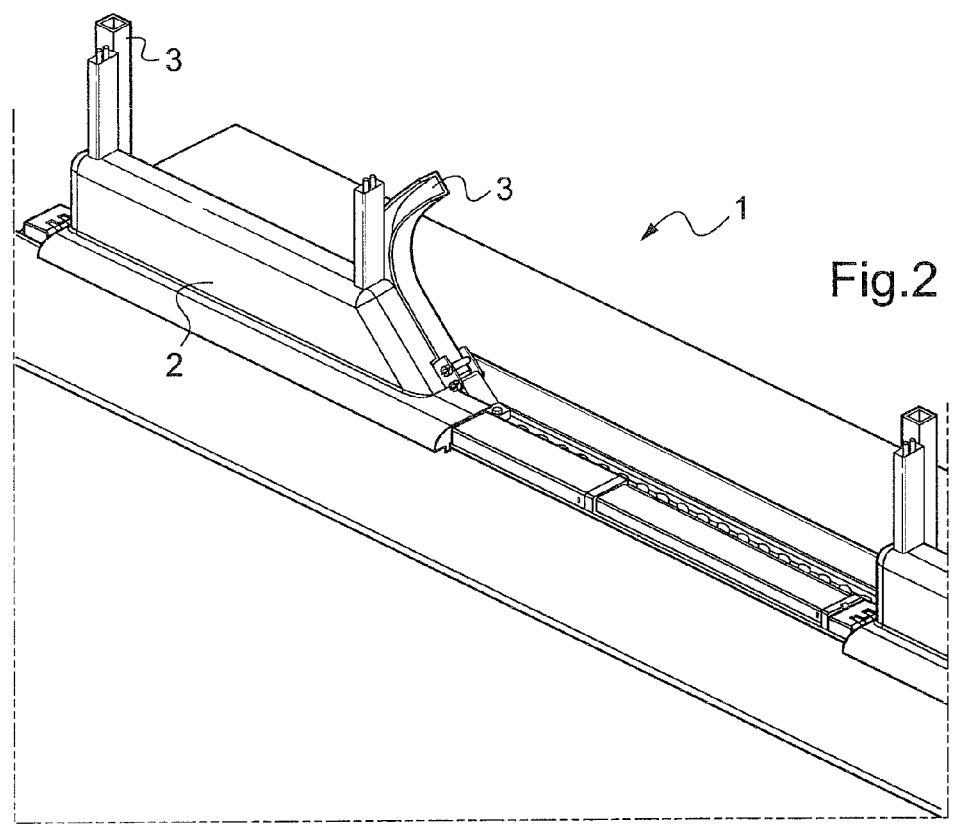

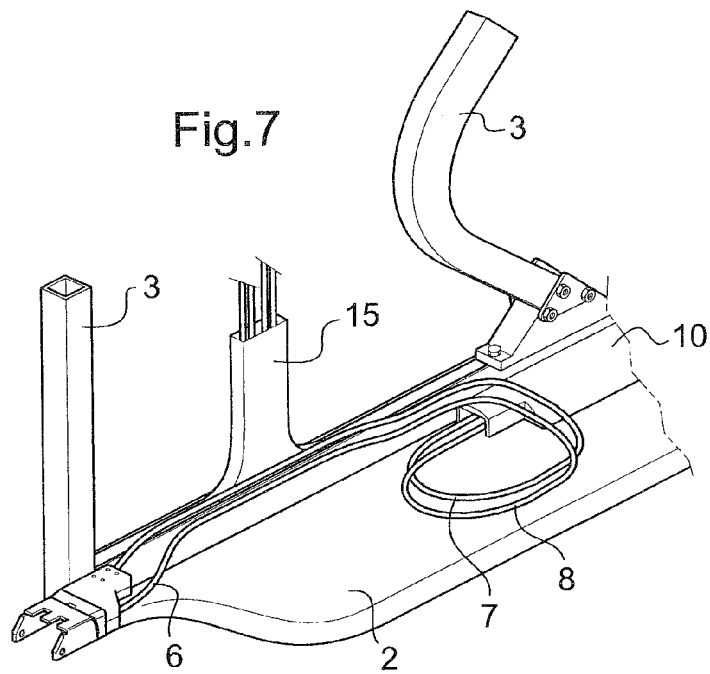
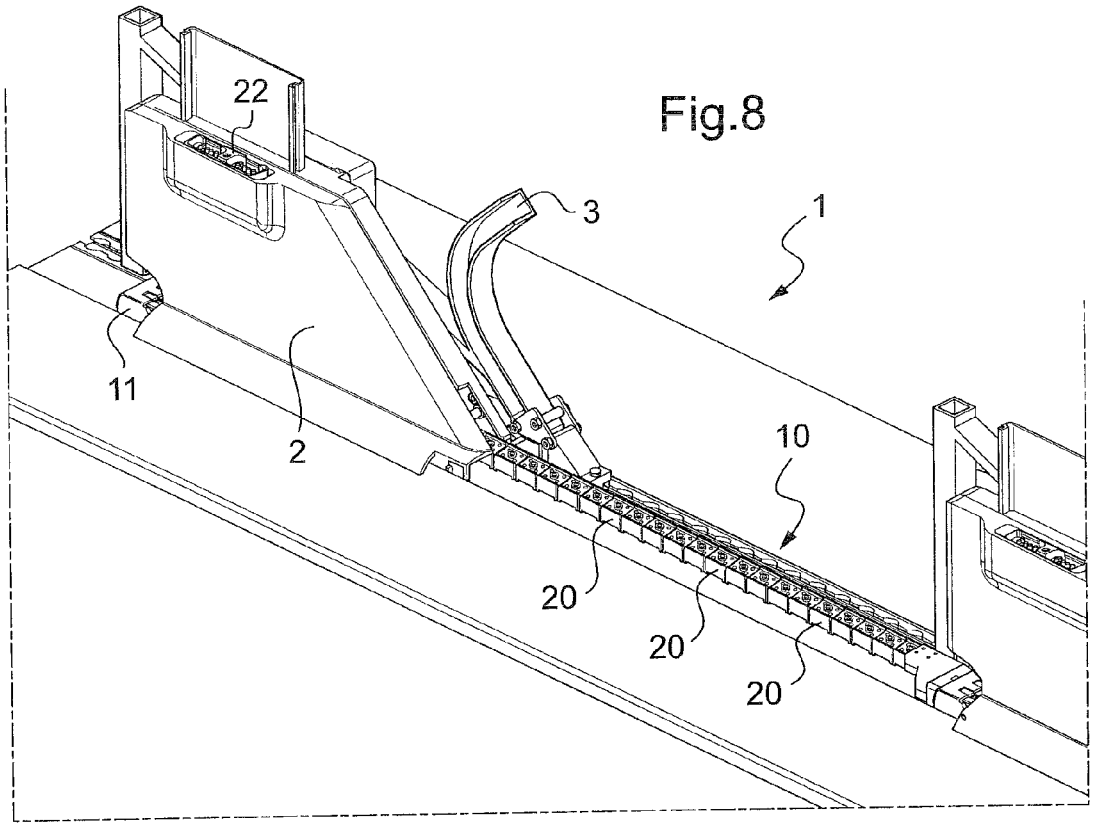

ELECTRICAL CONNECTION DEVICE FOR MAKING SEAT TO SEAT CONNECTIONS

FIELD OF THE INVENTION

The present invention relates to an electrical connection device for making seat-to-seat connections, in particular between aircraft seats. Known seats used in aircraft include electronic equipment incorporated in the seat, e.g. forming a portion of an entertainment system. This equipment is connected to two connectors situated respectively at the front and at the rear of the seat so as to enable electrical connections to be made with the seats in the preceding and following rows.

BACKGROUND OF THE INVENTION

Consequently, such a system makes use of two pairs of connectors per seat, an inlet pair and an outlet pair, thereby giving rise to problems in terms of weight and cost, while also degrading shielding and increasing losses in the electric line by adding connections.

The front connector of a seat is connected via a cable bundle segment to a rear connector of the preceding seat. Because of the large values of the minimum radii of curvature that can be accepted by the cables, it is necessary to dimension the cable bundle segments connecting the front connector of the seat to the rear connector of the seat of the preceding row specifically to fit a precise utilization. Consequently, such a solution does not make it possible to obtain modularity in the connections made between pairs of rows of seats while they are being installed, nor does it make it possible to modify quickly and at will the configurations of seats between business class and economy class, for example, within an aircraft for one-off use.

OBJECT AND SUMMARY OF THE INVENTION

An object of the invention is to remedy the above-mentioned drawbacks, and it achieves it by means of an electrical connection device for making a connection between a first seat and a second seat disposed in front of or behind the first seat, in particular in aircraft, wherein the device comprises:
- a casing secured to the first seat and receiving an inlet cable bundle and an outlet cable bundle;
- a cable inlet connector connected to the inlet cable bundle and secured to the casing; and
- a retractable strip received at least in part inside the casing, the outlet cable bundle, extending in said strip, which strip is capable of sliding outwards from the casing in such a manner as to connect said casing to the cable inlet connector of the second seat.

The term "casing secured to the first seat" should be understood as covering a casing that is rigidly fastened to the first seat, whether permanently or removably.

With a connection device according to exemplary embodiments of the invention, a given system can very easily be used for seats at a pitch varying over a range of plus or minus 25 centimeters (cm), even when using cables that have a relatively large minimum radius of curvature.

Furthermore, the electrical connection device according to exemplary embodiments of the invention makes it possible to use a single pair of connectors for making the electrical connection between two seats.

Since the casing is secured to the first seat, it can be mounted to the seat without there being any need to install the casing before installing the seats.

Furthermore, the casing need not be received in the floor of the aircraft cabin, but may merely be placed thereon, which means that there is no need to make arrangements in the cabin floor.

The strip is advantageously fully retractable into the inside of the casing.

In a variant, the strip could be retractable in part only into the inside of the casing, for example being retractable over only about 60% of its length.

By way of example, the strip extends over a length lying in the range 0 to 50 cm.

Advantageously, the outlet cable bundle presents a reserve length of cable inside the casing, said reserve length of cable enabling the cable to accompany the movement of the strip, while conserving an acceptable minimum radius of curvature.

The term "reserve length of cable" designates a length of cable that is in excess when the strip is retracted inside the casing.

By way of example, the cables used present a minimum radius of curvature of the order of 25 millimeters (mm).

The casing may be configured for being placed vertically or horizontally on the aircraft cabin floor.

Advantageously, the device includes electronic equipment connected to the inlet and outlet cable bundles, said electronic equipment being incorporated in the casing, for example. In a variant, the electronic equipment is distinct from the casing and is connected thereto.

The connection device advantageously includes a cover suitable for covering the strip when it is deployed outside the casing.

By way of example, the first and second seats form portions of respective successive rows of seats in the aircraft.

The retractable strip advantageously comprises a succession of elements hinged to one another and receiving the outlet cable bundle over at least a fraction of its length. By way of example, this succession of elements defines a caterpillar system and enables the curvature of the cables in the bundle to be controlled, thereby advantageously enabling said curvature to be maintained in a predefined range of values.

The casing advantageously includes a track on which the caterpillar system can slide when the strip is moved.

BRIEF DESCRIPTION OF THE DRAWINGS

Other advantageous properties and characteristics of the invention appear from the following description of non-limiting embodiments thereof, and on examining the accompanying drawings, in which:

FIGS. 1 and 2 show different configurations of a first embodiment of an electrical connection device of the invention;

FIG. 7 shows a variant of the FIG. 1 device;

FIG. 8 shows another variant of the FIG. 1 device;

MORE DETAILED DESCRIPTION

FIG. 1 shows a first example of an electrical connection device given overall reference 1 and extending between a first seat and a second seat.

The device comprises a casing 2 secured to a first seat that is represented solely by it legs 3.

Figure 4:
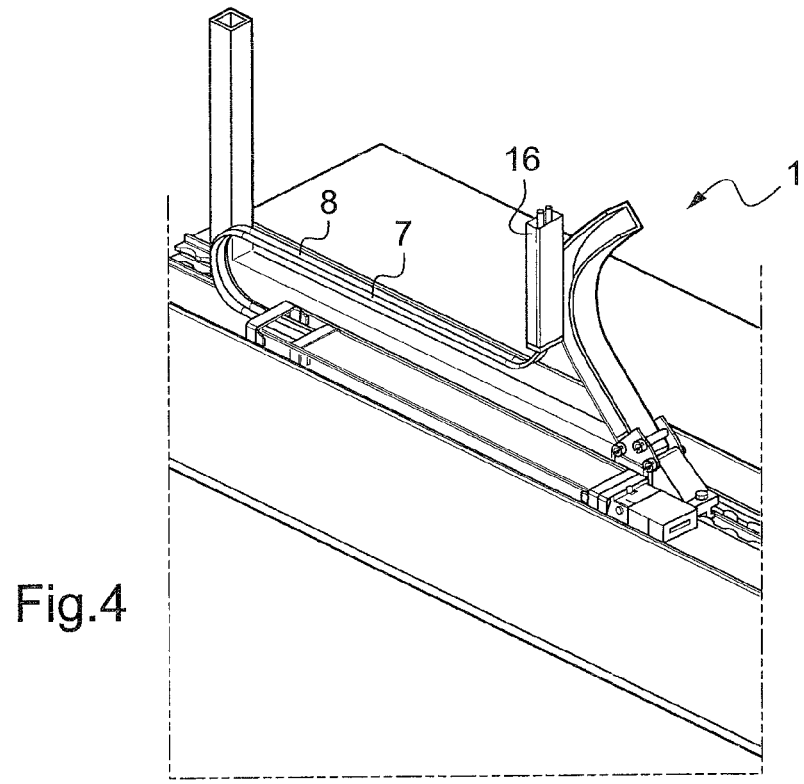
FIGS. 4 and 5 are transparent views corresponding to FIGS. 1 and 2.
Figure 5:
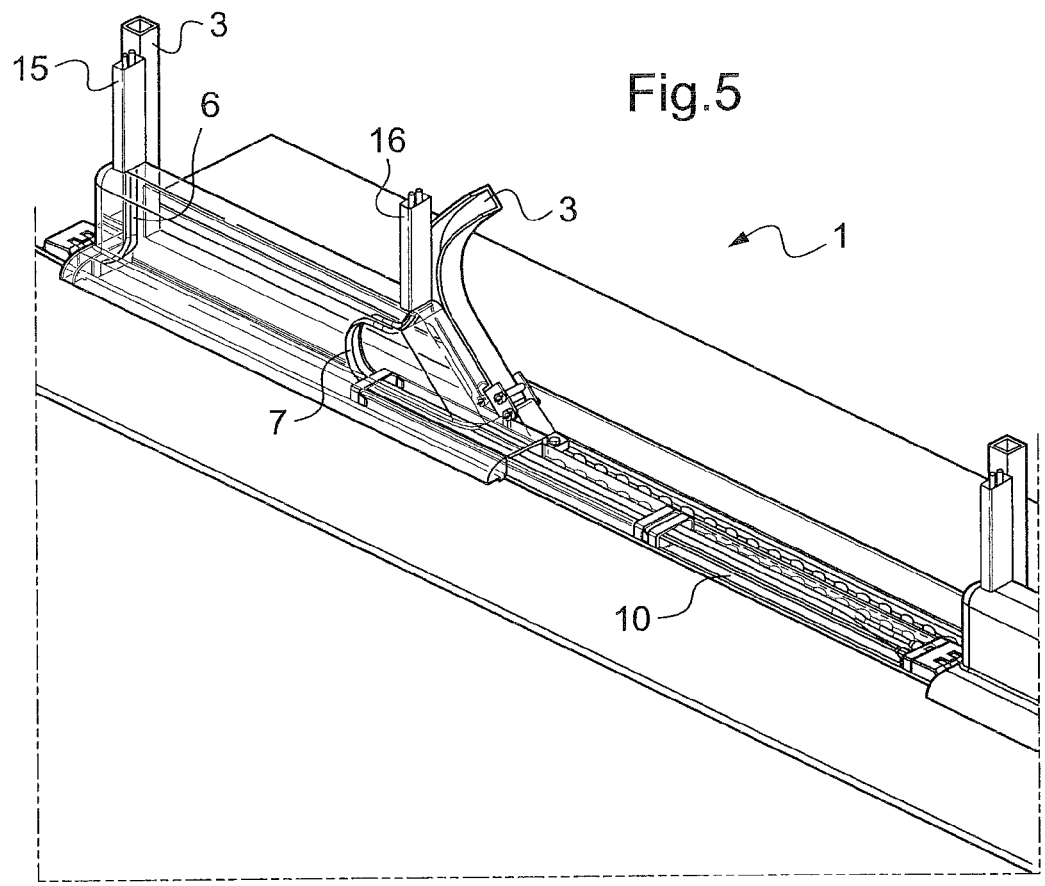

As can be seen in FIGS. 4 and 5, the casing 2 receives an inlet cable bundle 6 and an outlet cable bundle 7.

Figure 3:
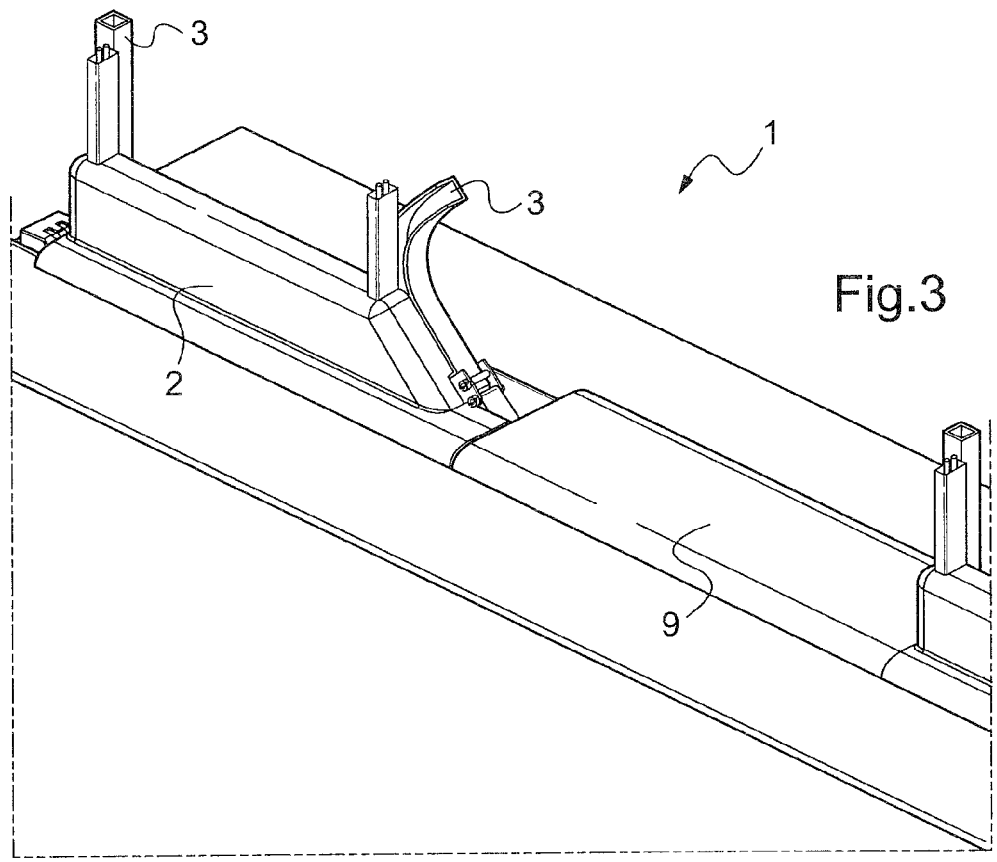
FIG. 3 shows the addition of a cover to the device of FIGS. 1 and 2.

The casing 2 also receives a strip 10 that can slide between a position in which it is fully housed inside the casing 1, as shown in FIG. 1, and a position in which it is deployed outside the casing 1, as shown in FIG. 3. In the example described, the strip 10 extends for example over a length lying in the range 0 to 50 cm.

The casing also has an inlet connector 11 secured to the casing 1.

When the strip 10 is deployed, it can come into contact with the inlet connector 11 of the adjacent seat, the seat situated behind in the example described, in order to provide electrical connections between the two seats or, where appropriate, between two rows of aircraft seats.

As can be seen in a first embodiment of the invention shown in FIG. 5, the inlet cable bundle 6 is connected firstly to the inlet connector 11 and secondly to electronic equipment (not shown) via an outlet 15. By way of example, the electronic equipment may form part of the entertainment system incorporated in the seat.

In the example of FIGS. 1 to 5, the outlet cable bundle 7 is connected firstly to the above-mentioned electronic equipment by an outlet 16, and extends at its other end inside the strip 10.

As can be seen in FIG. 5, and in particular in comparison with FIG. 4, the outlet cable bundle 7 presents a certain amount of reserve length 8 inside the casing 2, thereby enabling it to accompany the movement of the strip 10 when the strip is deployed out from the casing 1, while conserving a minimum radius of curvature that is acceptable, e.g. of the order of 25 mm.

As can be seen in FIG. 3, the electrical connection device advantageously includes a cover 9 serving to cover the strip 10 when it is deployed outside the casing 1 so as to avoid making it accessible and visible to a passenger.

Figure 6:
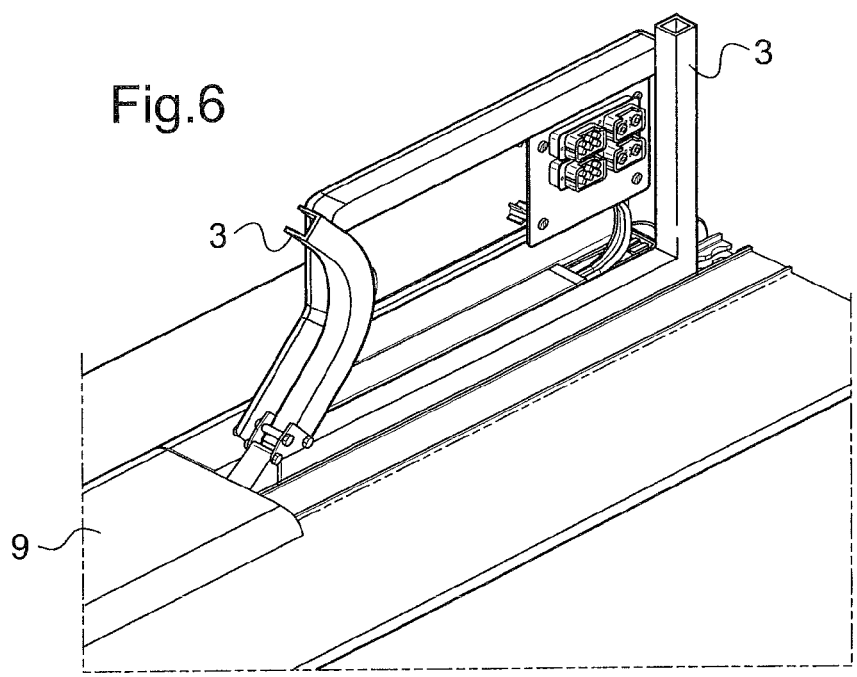
FIG. 6 shows another embodiment of an electrical connection device of the invention.

FIG. 6 shows another example of an electrical connection device of the invention, that differs from the example shown in the preceding figures by the fact that the electronic equipment is incorporated inside the casing 2.

In the examples of FIGS. 1 to 6, the casing 2 is configured to be placed vertically on the aircraft cabin floor.

In the example of FIG. 7, the casing is configured to be placed horizontally on the aircraft cabin floor.

Figure 9:
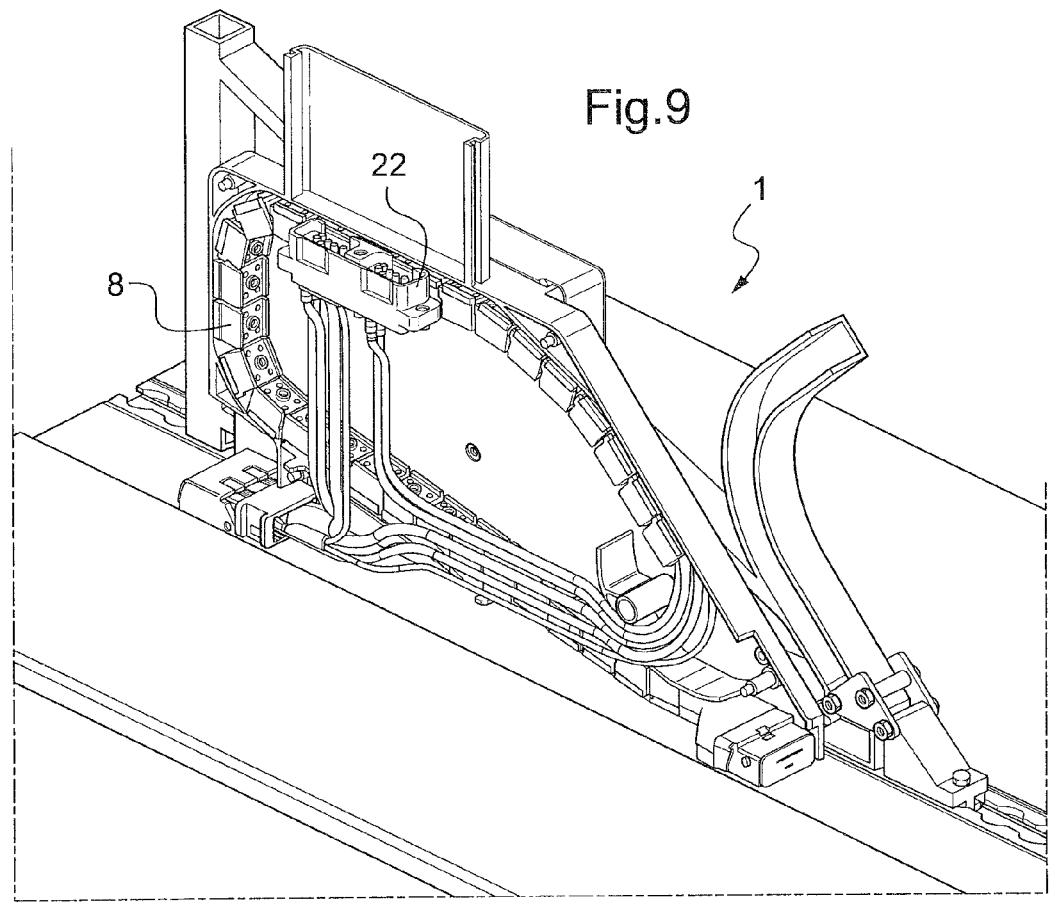
FIGS. 9 and 10 are transparent views of the FIG. 8 device in two different configurations.
Figure 10:
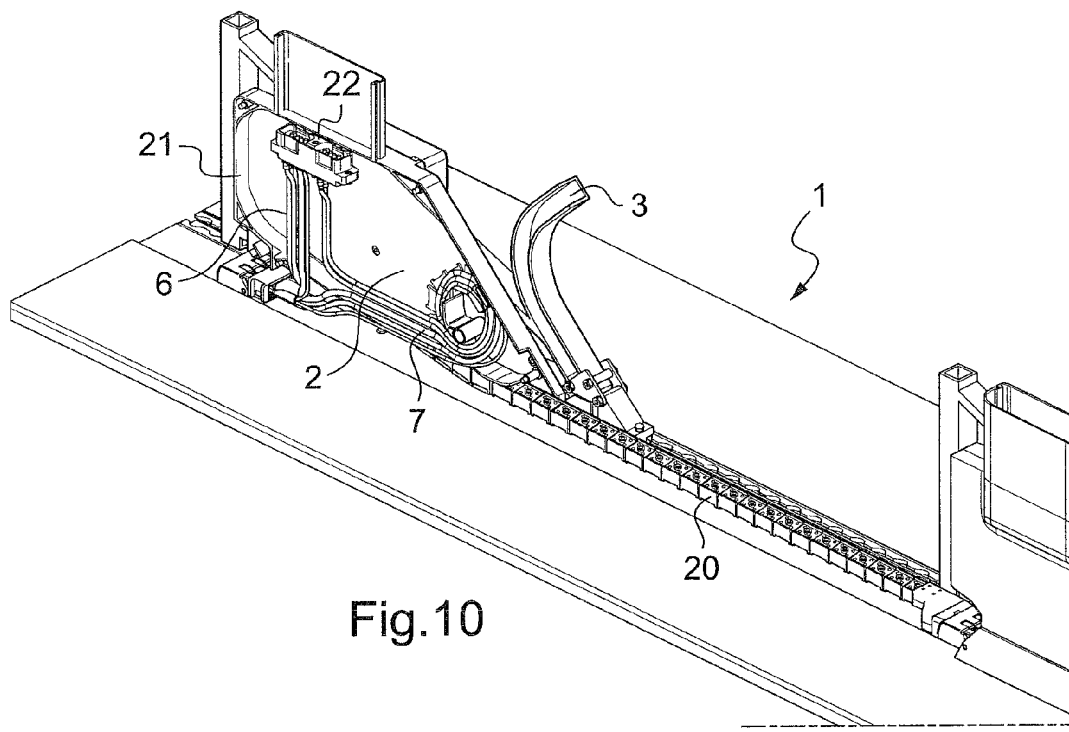

FIGS. 8 to 10 show an electrical connection device 1 that differs from that shown in FIGS. 1 to 7 by the fact that the retractable strip 10 comprises a succession of elements 20 that are hinged to one another and that receive the outlet cable bundle 7 over a fraction of its length. In the example shown, the strip comprises ten to twenty elements 20, this succession of elements defining a caterpillar system.

As can be seen in FIGS. 9 and 10, which show the casing respectively when the strip is retracted inside the casing and when the strip 10 is deployed to the outside, the caterpillar system serves to control the curvature of the outlet cable bundle 7 while it is being moved.

As can be seen in FIGS. 8 to 10, the casing in this example may have guide means for guiding the elements 20 while the strip 10 is moving. By way of example, these guide means are constituted by a track 21 formed inside the casing 22 and on which the caterpillar system can slide.

As can be seen in FIGS. 8 to 10, the inlet cable bundle 6 and the outlet cable bundle 7 are connected to electronic equipment by means of a connector 22.

Figure 11:
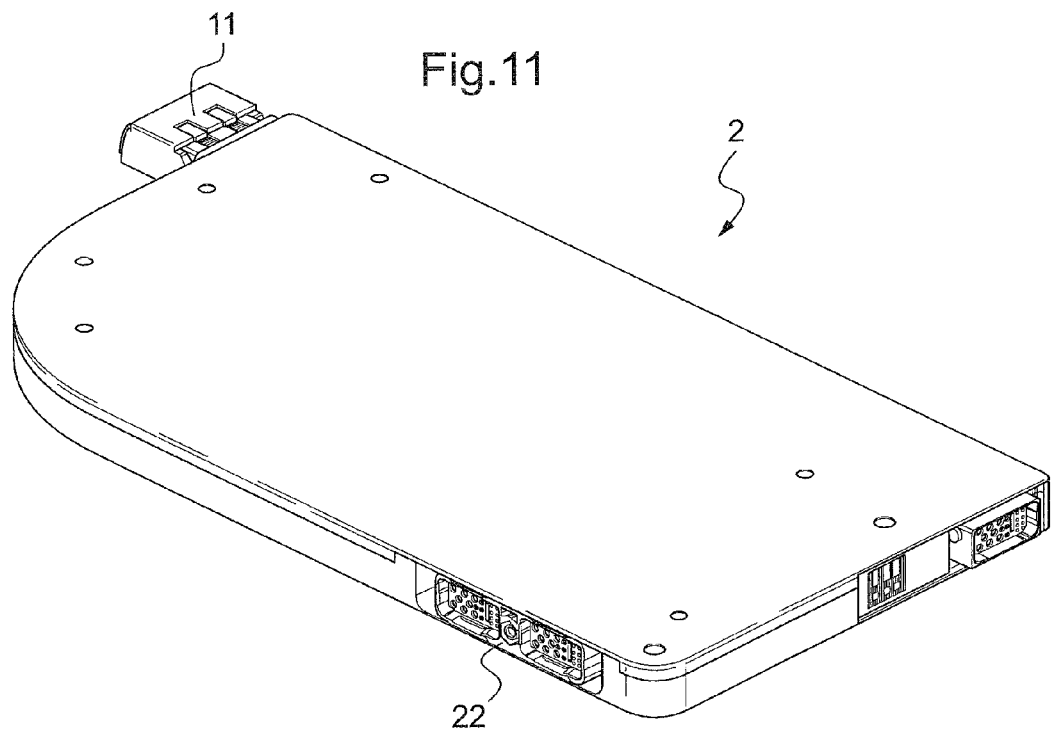
FIG. 11 shows another variant of the FIG. 1 device.
Figure 12:
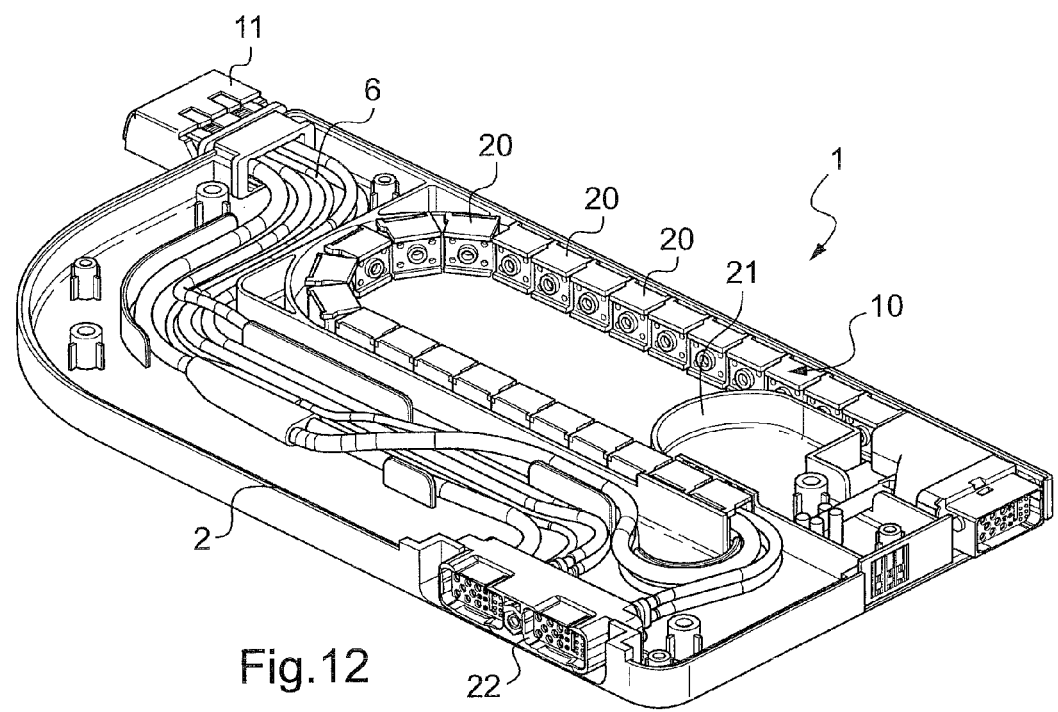
FIGS. 12 and 13 are transparent views of the FIG. 11 device in two different configurations.
Figure 13:
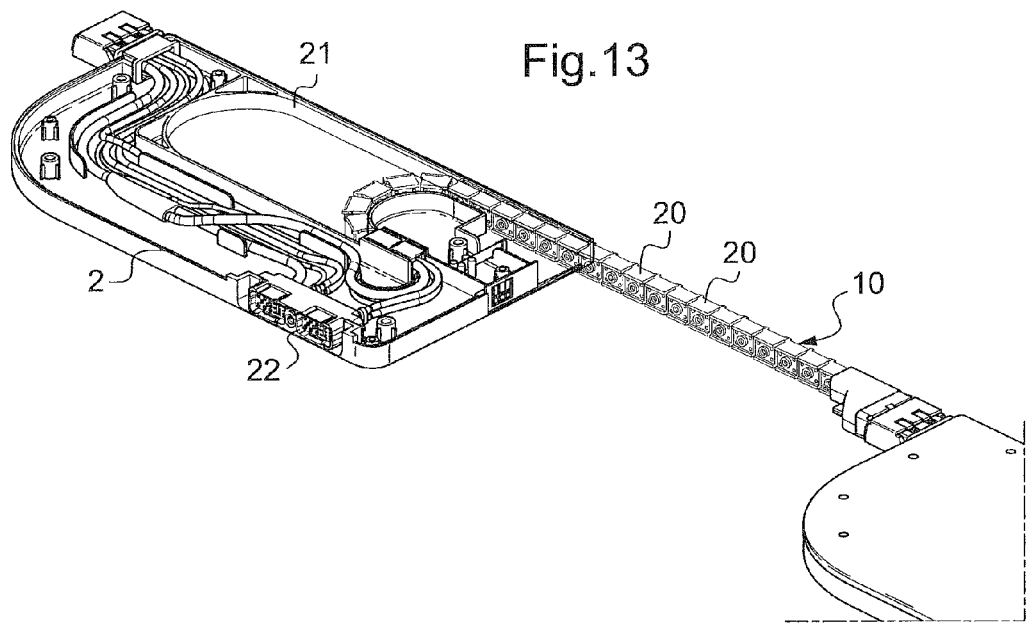

With reference to FIGS. 11 to 13, there follows a description of another example of an electrical connection device of the invention. The device 1 shown in FIG. 11 has a casing 2 of flat shape, e.g. being configured for fastening in a horizontal position under a seat. As can be seen in FIGS. 12 and 13, the retractable strip 10 of the connection device in this example likewise includes a succession of elements 20 defining a caterpillar system as in the example described with reference to FIGS. 8 to 10. In similar manner to the example described with reference to FIGS. 8 to 10, the inlet cable bundle 6 and the outlet cable bundle 7 come together within a connector 22 for connection to electronic equipment (not shown).

Figure 14:
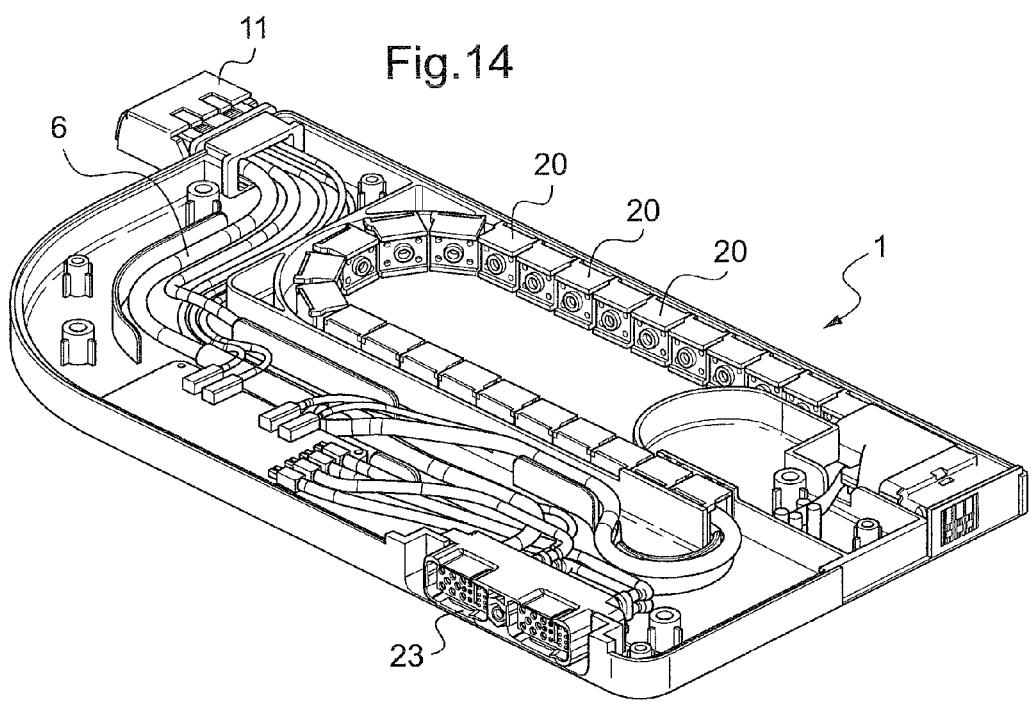
FIG. 14 shows a variant of the FIG. 11 device.

FIG. 14 shows a variant of the device shown in FIGS. 11 to 13, in which variant, in similar to the connection device shown in FIG. 6, the electronic equipment is incorporated inside the casing 2. In this example, the casing is connected to the electrical systems of the seat by means of a connector 23.

In the claims, the expression comprising all should be understood as being synonymous with "comprising at least one" unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An electrical connection device for making a connection between a first seat and a second seat disposed in front of or behind the first seat, in particular in aircraft, wherein the device comprises:
    a casing secured to the first seat and receiving an inlet cable bundle and an outlet cable bundle;
    a cable inlet connector connected to the inlet cable bundle and secured to the casing; and
    a retractable strip received at least in part inside the casing, the outlet cable bundle, extending in said strip, which strip is capable of sliding outwards from the casing in such a manner as to connect said casing to the cable inlet connector of the second seat,
    wherein the retractable strip comprises a succession of elements hinged relative to one another and receiving the outlet cable bundle over a fraction of its length.

2. A device according to claim 1, wherein the succession of elements defines a caterpillar system.

3. A device according to claim 2, wherein the casing includes a track on which the caterpillar system can slide when the strip is moved.

4. A device according to claim 1, wherein the strip is fully retractable into the inside of the casing.

5. A device according to claim 1, wherein the strip extends over a length that is less than 50 cm.

6. A device according to claim 1, wherein the outlet cable bundle presents a reserve length of cable inside the casing.

7. A device according to claim 1, including electronic equipment connected to the inlet and outlet cable bundles.

8. A device according to claim 7, wherein the electronic equipment is incorporated in the casing.

9. A device according to claim 1, including a cover suitable for covering the strip when deployed outside the casing.

10. A device according to claim 1, wherein the first and second seats form portions of respective successive rows of seats.

11. A device according to claim 6, wherein the cables have a minimum radius of curvature of about 25 mm.

* * * * *